United States Patent
Ramappa et al.

(10) Patent No.: US 12,369,030 B2
(45) Date of Patent: Jul. 22, 2025

(54) NETWORK SLICE ALLOCATION AND NETWORK SLICE REJECTION

(71) Applicant: Apple Inc., Cupertino, CA (US)

(72) Inventors: Shashanka Totadamane Ramappa, Shivamogga (IN); Anikethan Ramakrishna Vijaya Kumar, Mysuru (IN); Krisztian Kiss, Rancho Santa Fe, CA (US); Nirlesh Koshta, Bangalore (IN); Sridhar Prakasam, Fremont, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 17/930,790

(22) Filed: Sep. 9, 2022

(65) Prior Publication Data

US 2023/0100377 A1 Mar. 30, 2023

(30) Foreign Application Priority Data

Sep. 24, 2021 (IN) .............................. 202141043424

(51) Int. Cl.
*H04W 12/082* (2021.01)
*H04W 12/30* (2021.01)
*H04W 48/16* (2009.01)
*H04W 60/04* (2009.01)

(52) U.S. Cl.
CPC ......... *H04W 12/082* (2021.01); *H04W 12/30* (2021.01); *H04W 48/16* (2013.01); *H04W 60/04* (2013.01)

(58) Field of Classification Search
CPC ... H04W 48/16; H04W 60/04; H04W 12/082; H04W 12/30; H04W 36/12; H04W 48/12; H04W 48/18

USPC ........................................................ 455/435.1
See application file for complete search history.

(56) References Cited

U.S. PATENT DOCUMENTS

| | | | | |
|---|---|---|---|---|
| 2020/0322879 | A1* | 10/2020 | Zhu | H04W 60/00 |
| 2021/0352619 | A1* | 11/2021 | Ryu | H04W 68/02 |
| 2021/0368339 | A1* | 11/2021 | Watfa | H04W 12/08 |

(Continued)

FOREIGN PATENT DOCUMENTS

| | | |
|---|---|---|
| CN | 110999431 | 4/2020 |
| CN | 113411815 | 9/2021 |
| EP | 3709707 | 9/2020 |

(Continued)

OTHER PUBLICATIONS

Huawei et al., "Clarification on determination of Registration Area", 3GPP TSG SA2 Meeting #105e, S2-2202049, Mar. 29, 2022, 7 sheets.

(Continued)

*Primary Examiner* — Hirdepal Singh
(74) *Attorney, Agent, or Firm* — Fay Kaplun & Marcin, LLP

(57) ABSTRACT

A user equipment (UE) is configured to transmit a first registration request to a network, receive a registration accept message in response to the first registration request comprising a rejected network slice and an indication of a rejection cause corresponding to the rejected network slice and transmit a second registration request to the network comprising a requested network slice, wherein the requested network slice and the rejected network slice are a same network slice.

20 Claims, 14 Drawing Sheets

(56) References Cited

U.S. PATENT DOCUMENTS

2024/0187976 A1* 6/2024 Lu .................... H04W 48/18
2024/0284377 A1* 8/2024 Tiwari ................ H04W 48/18

FOREIGN PATENT DOCUMENTS

| WO | 2021/021423 | 2/2021 |
| WO | 2021/021580 | 2/2021 |
| WO | WO-2022159725 A1 * | 7/2022 |

OTHER PUBLICATIONS

Motorola Mobility, Lenovo, "Allowed NSSAI usage information", SA WG2 Meeting #S2-121, S2-173291, May 9, 2017, 3 sheets.
3GPP, Technical Specification Group Core Network and Terminals; Non-Access-Stratum (NAS) protocol for 5G System (5GS); Stage 3; (Release 17), Jul. 2, 2021, 10 sheets.

* cited by examiner

Table 700

Rejected S-NSSAI:
Cause value
Bits

| 4 | 3 | 2 | 1 | |
|---|---|---|---|---|
| 0 | 0 | 0 | 0 | S-NSSAI not available in the current PLMN or SNPN |
| 0 | 0 | 0 | 1 | S-NSSAI not available in the current registration area |
| 0 | 0 | 1 | 0 | S-NSSAI not available due to the failed or revoked network slice-specific authentication and authorization. |
| 0 | 0 | 1 | 1 | S-NSSAI non service area or S-NSSAI not available in current TA |

All other values are reserved.

Fig. 7

Table 900

Rejected S-NSSAI:
Cause value
Bits

| 4 | 3 | 2 | 1 | |
|---|---|---|---|---|
| 0 | 0 | 0 | 0 | S-NSSAI not available in the current PLMN or SNPN |
| 0 | 0 | 0 | 1 | S-NSSAI not available in the current registration area |
| 0 | 0 | 1 | 0 | S-NSSAI not available due to the failed or revoked network slice-specific authentication and authorization. |
| 0 | 0 | 1 | 1 | S-NSSAI not available in the current AMF |

All other values are reserved.

ion request to the network comprising a requested network slice, wherein the requested network slice and the rejected network slice are a same network slice.

NETWORK SLICE ALLOCATION AND NETWORK SLICE REJECTION

BACKGROUND

A user equipment (UE) may connect to a network that deploys multiple network slices. Generally, a network slice refers to an end-to-end logical network that is configured to provide a particular service and/or possess particular network characteristics. Each network slice may be isolated from one another but run on a shared network infrastructure. Thus, each network slice may share network resources but facilitate different functionality.

During operation, a scenario may occur in which the UE is unable to access a desired network slice. This may have a negative impact on the user experience associated with the UE and/or an application running on the UE. Accordingly, there exists a need for mechanisms that enable the UE to access its desired network slice.

SUMMARY

Some exemplary embodiments are related to a processor of a user equipment (UE) configured to perform operations. The operations include transmitting a first registration request to a network, receiving a registration accept message in response to the first registration request comprising a rejected network slice and an indication of a rejection cause corresponding to the rejected network slice and transmitting a second registration request to the network comprising a requested network slice, wherein the requested network slice and the rejected network slice are a same network slice.

Other exemplary embodiments are related to a processor of a network function configured to perform operations. The operations include receiving a first registration request from a user equipment (UE), transmitting a first registration accept message in response to the first registration request comprising a rejected network slice and an indication of a rejection cause corresponding to the rejected network slice, receiving a second registration request from the UE comprising a requested network slice, wherein the requested network slice and the rejected network slice are a same network slice and transmitting a second registration accept message in response to the second registration request.

Still further exemplary embodiments are related to a processor of a user equipment (UE) configured to perform operations. The operations include establishing a packet data unit (PDU) session on a first network slice, determining that a PDU session transfer from the first network slice to a second different network slice is to be performed and continuing the PDU session on the second different network slice.

BRIEF DESCRIPTION OF THE DRAWINGS

FIG. 7 shows a table comprising cause values and corresponding rejection causes for rejected network slice selection assistance information (NSSAI).

DETAILED DESCRIPTION

Figure 1:
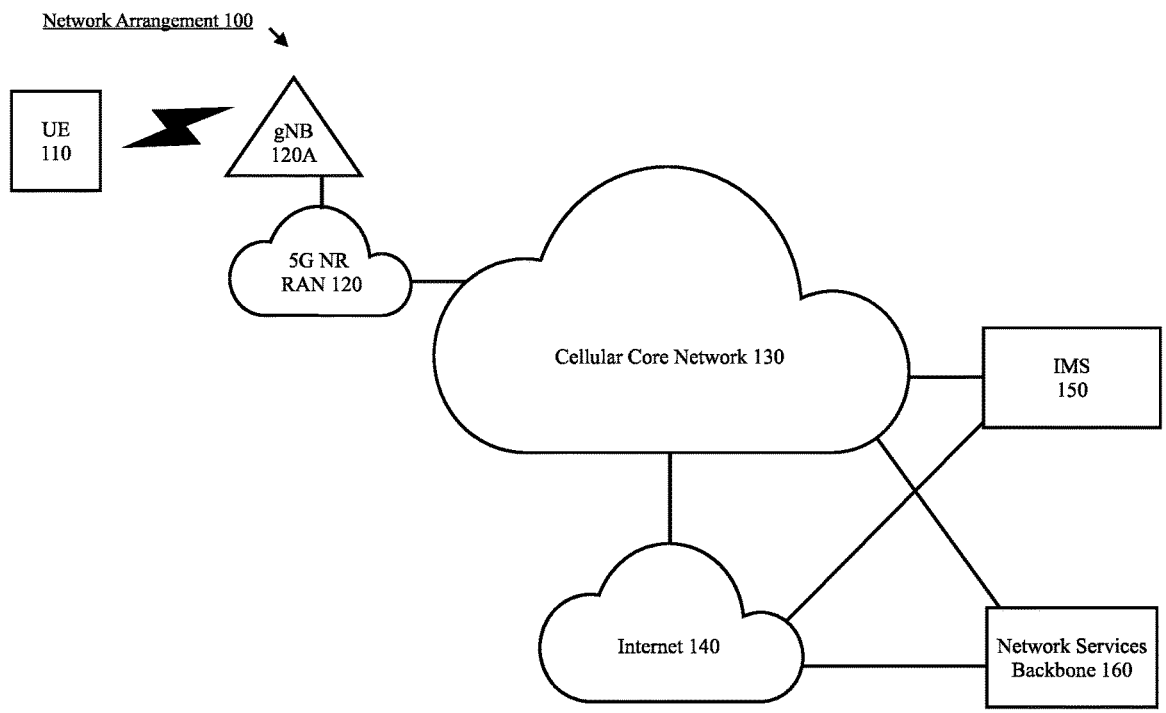
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce enhancements for network slicing. In one aspect, the exemplary embodiments relate to network slice rejection. In another aspect, the exemplary embodiments relate to network slice allocation and include mechanisms for transferring an existing packet data unit (PDU) session from a first network slice to a second different network slice. Each of these exemplary aspects will be described in detail below.

The exemplary embodiments are described with regard to a user equipment (UE). However, the use of the term "UE" is merely for illustrative purposes. The exemplary embodiments may be utilized with any electronic component that may establish a connection with a network and is configured with the hardware, software, and/or firmware to exchange information and data with the network. Therefore, the UE as described herein is used to represent any suitable electronic component.

The exemplary embodiments are described with regard to a fifth generation (5G) network that supports network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose. Throughout this description, reference to a network slice may represent any type of end-to-end logical network that is configured to serve a particular purpose and implemented on the 5G physical infrastructure.

Those skilled in the art will understand that 5G may support a variety of different use cases, e.g., enhanced mobile broadband (eMBB), enhanced machine type communication (eMTC), industrial internet of things (IIoT), etc. Each type of use case may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

A network slice may be identified by single network slice selection assistance information (S-NSSAI). Each instance of S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and the terms "NSSAI" or "S-NSSAIs" may be used interchangeably to refer to one or more network slices.

The UE may be configured to perform any of a wide variety of different tasks. Thus, the UE may be configured to utilize one or more network slices. To provide an example, the UE may utilize a first network slice for one or more carrier services (e.g., voice, multimedia messaging service (MMS), Internet, etc.) and a second different network slice for a third-party service. However, the configured purpose of a network slice is beyond the scope of the exemplary embodiments. The exemplary embodiments are not limited to any particular type of network slice.

In one aspect, the exemplary embodiments relate to network slice rejection. During operation, the UE may transmit a registration request to the network. The registration request may comprise, in part, a request for one or more network slices that the UE may want to access (e.g., "requested NSSAI"). In response, the network may transmit a registration accept message to the UE comprising an indication that the UE is permitted to access one or more of the requested NSSAI (e.g., "allowed NSSAI") and/or an indication that one or more of the requested NSSAI are not available (e.g., "rejected NSSAI").

The exemplary embodiments are also described with regard to a registration area (RA). Those skilled in the art will understand that a "RA" refers to a set of tracking areas that are configured for a particular UE. For example, a RA may comprise tracking area identity (TAI)-1, TAI-2, TAI-3 and TAI-4. Throughout this description, any reference to a RA comprising a particular number of TAIs is merely provided for illustrative purposes. Each RA may comprise any appropriate number of TAIs.

Each tracking area within a RA may not support the same network slices. For example, the RA may comprise TAI-1 configured to support access to network slice A and TAI-2 configured to support access to network slice B.

Under conventional circumstances, a rejected network slice is applied to the entire RA even though there are some individual tracking areas within the RA that may not support the network slice. It has been identified that this may cause a scenario in which the UE is located within a TAI that supports a desired network slice, but the UE has already been barred from accessing that network slice within the current RA. To provide an example, consider a scenario in which the RA consists of TA-1 and TA-2. The UE may transmit a registration request to the network while located within TAI-1 that includes network slice B within the requested NSSAI. The registration accept message may indicate that the request for network slice B is rejected in this RA because TAI-1 does not support access to network slice B. The UE may be configured to apply the rejected NSSAI to the current RA. Thus, if the UE moves from TAI-1 to TAI-2, the UE may not be permitted to access network slice B based on the rejected NSSAI received while located within TAI-1 because it is applicable to the entire RA which includes TAI-2.

The exemplary embodiments introduce techniques for implementing network slice rejection at a tracking area level. These exemplary techniques may allow the UE to avoid scenarios in which the UE is located within a TAI that supports a particular network slice but is unable to access the particular network slice. These exemplary techniques may be used in conjunction with currently implemented network slice rejection mechanisms, future implementations of network slice rejection mechanisms or independently from other network slice rejection mechanisms.

The exemplary embodiments are also described with regard to an access and mobility management function (AMF). Those skilled in the art will understand that the AMF is a control plane function and may perform operations related to registration management and connection management. Each RA and/or TAI may be configured with one or more AMFs. It should be understood that the operations performed by the AMF as described herein may be performed by one or more other network functions, e.g., the use of the AMF is only exemplary.

Under conventional circumstances, a requested network slice may be rejected because it is not supported by a serving AMF. This rejection may be applied to the entire RA even though there may be other AMFs capable of serving the UE within the current RA. It has been identified that this may cause a scenario in which the UE is located within a TAI that supports a desired network slice, but the UE has already been barred from accessing that network slice within the current RA. To provide an example, the UE may transmit a registration request to a serving AMF while located within TAI-1 that includes network slice A and network slice B within the requested NSSAI. The registration accept message may indicate that the request for network slice A is accepted and the request for network slice B is rejected in this RA because the serving AMF does not support access to network slice B. This rejection applies to the entire RA despite other AMFs configured to support network slice B being able to serve the UE in the same tracking area. Thus, if the UE wants to use the services of network slice B instead of network slice A, the UE may not be permitted to access network slice B based on the rejected NSSAI received while located within TAI-1 despite being in a tracking area where a different AMF can support access to network slice B because the rejected NSSAI is applicable at the RA level and not the AMF level.

The exemplary embodiments introduce techniques for implementing network slice rejection at an AMF level when there are multiple AMFs available in the AMF pool. These exemplary techniques may allow the UE to avoid scenarios in which the UE is located within a TAI that supports a particular network slice but is unable to access the particular network slice. These exemplary techniques may be used in conjunction with currently implemented network slice rejection mechanisms, future implementations of network slice rejection mechanisms or independently from other network slice rejection mechanisms.

The exemplary embodiments are also described with regard to a PDU session. Those skilled in the art will understand that the term "PDU session" generally refers to a logical connection between the UE and a data network. The UE may be configured with a PDU session to access network services associated with a network slice.

In another aspect, the exemplary embodiments introduce mechanisms for transferring an existing PDU session from one network slice to another network slice. It has been identified that under conventional circumstances, the transfer of an existing PDU session from one network slice to another network slice while maintaining service continuity is not possible in third generation partnership project (3GPP) networks. Instead, to obtain network services on a different network slice, the UE may be required to activate a new PDU session on the desired network slice within 3GPP access and within the same PLMN (or equivalent PLMN). The exemplary mechanisms described herein enable the transfer of an existing PDU session from one network slice to another network slice. These exemplary mechanisms may be used in conjunction with currently implemented network slice allocation mechanisms, future implementations of network slice allocation mechanisms or independently from other network slice allocation mechanisms. Specific examples of these exemplary mechanisms are described in detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long-term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
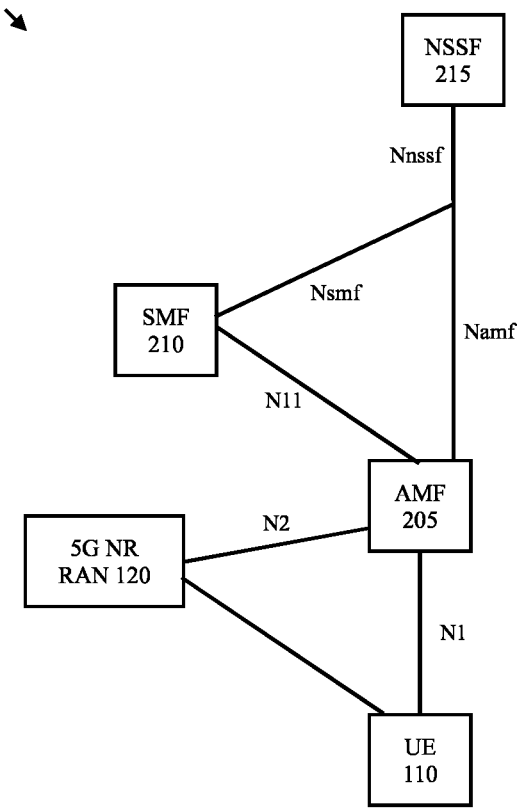
FIG. 2 shows an exemplary network architecture according to various exemplary embodiments.

FIG. 2 shows an exemplary network architecture 200 according to various exemplary embodiments. The following description will provide a general overview of the various components of the exemplary architecture 200. The specific operations performed by the components with respect to the exemplary embodiments will be described in greater detail after the description of the architecture 200.

Those skilled in the art will understand that the components of the exemplary architecture 200 may reside in various physical and/or virtual locations relative to the network arrangement 100 of FIG. 1. These locations may include, within the access network (e.g., RAN 120), within the core network 130, as separate components outside of the locations described with respect to FIG. 1, etc.

In FIG. 2, the various components are shown as being connected via connections labeled Nx (e.g., N1, N2, N11, Nnssf). Those skilled in the art will understand that each of these connections (or interfaces) are defined in the 3GPP Specifications. The exemplary architecture 200 is using these connections in the manner in which they are defined in the 3GPP Specifications. Furthermore, while these interfaces are termed connections throughout this description, it should be understood that these interfaces are not required to be direct wired or wireless connections, e.g., the interfaces may communicate via intervening hardware and/or software components. To provide an example, the UE 110 may exchange signals over the air with the gNB 120A. However, in the architecture 200 the UE 110 is shown as having a connection to the AMF 205. This connection or interface is not a direct communication link between the UE 110 and the AMF 205, instead, it is a connection that is facilitated by intervening hardware and software components. Thus, throughout this description the terms "connection" and "interface" may be used interchangeably to describe the Nx interface between the various components.

The architecture 200 includes the UE 110 and the 5G NR RAN 120. The UE 110 and the 5G NR RAN 120 are connected to the AMF 205. The AMF 205 is generally responsible for connection and mobility management in the 5G NR RAN 120. For example, the AMF 205 may perform operations related to registration management between the UE 110 and the core network 130. The exemplary embodiments are not limited to an AMF that performs the above referenced operations. Those skilled in the art will understand the variety of different types of operations an AMF may perform. Further, reference to a single AMF 205 is merely for illustrative purposes, an actual network arrangement may include any appropriate number of AMFs.

The AMF 205 is connected to the session management function (SMF) 210. The SMF 210 may perform operations related to session management such as, but not limited to, session establishment, session release, IP address allocation, policy and QoS enforcement, etc. The exemplary embodiments are not limited to an SMF that performs the above referenced operations. Those skilled in the art will understand the variety of different types of operations a SMF may perform. Further, reference to a single SMF 210 is merely for illustrative purposes, an actual network arrangement may include any appropriate number of SMFs.

The AMF 205 and the SMF 210 are also connected to the network slice selection function (NSSF) 215. The NSSF 215 performs various operations related to network slicing. For example, the NSSF 215 may select a set of network slice instances serving the UE 110. The NSSF 215 may also manage one or more databases that include a mapping table of S-NSSAI and the frequency bands in which the S-NSSAI is allowed to operate. The exemplary embodiments are not limited to an NSSF that performs the above referenced operations. Those skilled in the art will understand the variety of different types of operations a NSSF may perform. Further, reference to a single NSSF 215 is merely for illustrative purposes, an actual network arrangement may include any appropriate number of SMFs.

Figure 3:
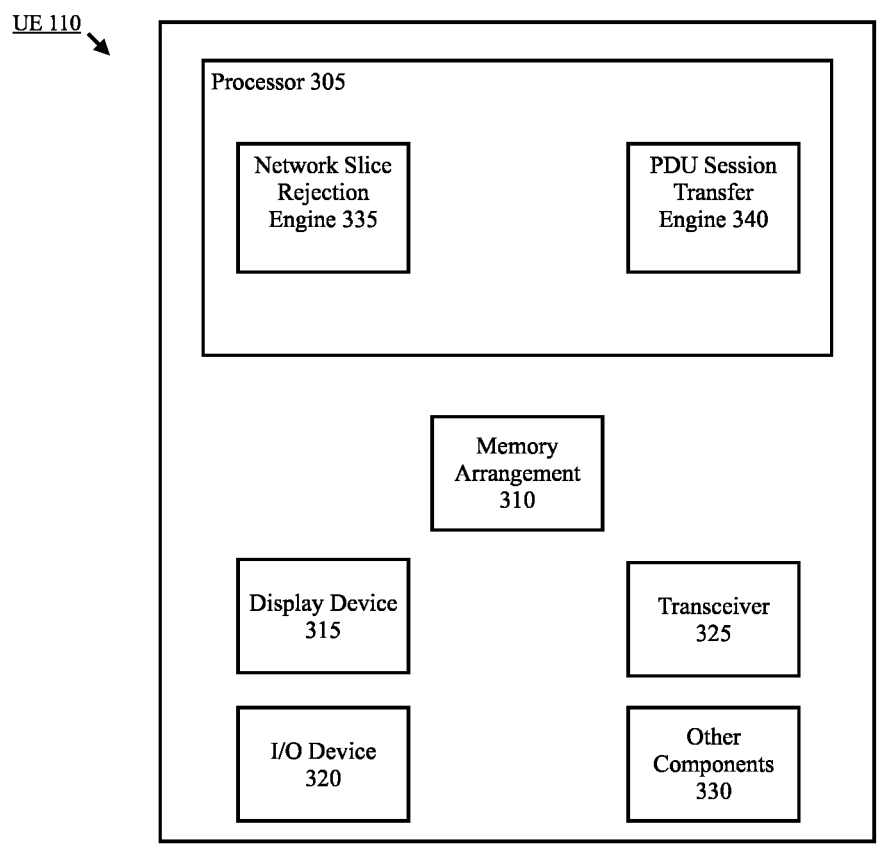
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a network slice rejection engine 335 and a PDU session transfer engine 340. The network slice rejection engine 335 may perform various operations related to handling rejected NSSAI at the UE 110 including, but not limited to, receiving a rejection cause and associating the rejected NSSAI with a particular TAI or AMF. The PDU session transfer engine 340 may perform various operations related to transferring an existing PDU session from a first network slice to a second different network slice. These operations may include, but are not limited to, initiating a procedure to activate particular network slice at the UE 110 and requesting that the PDU session be transferred to a different network slice.

The above referenced engines 335, 340 each being an application (e.g., a program) executed by the processor 305 is merely provided for illustrative purposes. The functionality associated with the engines 335, 340 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
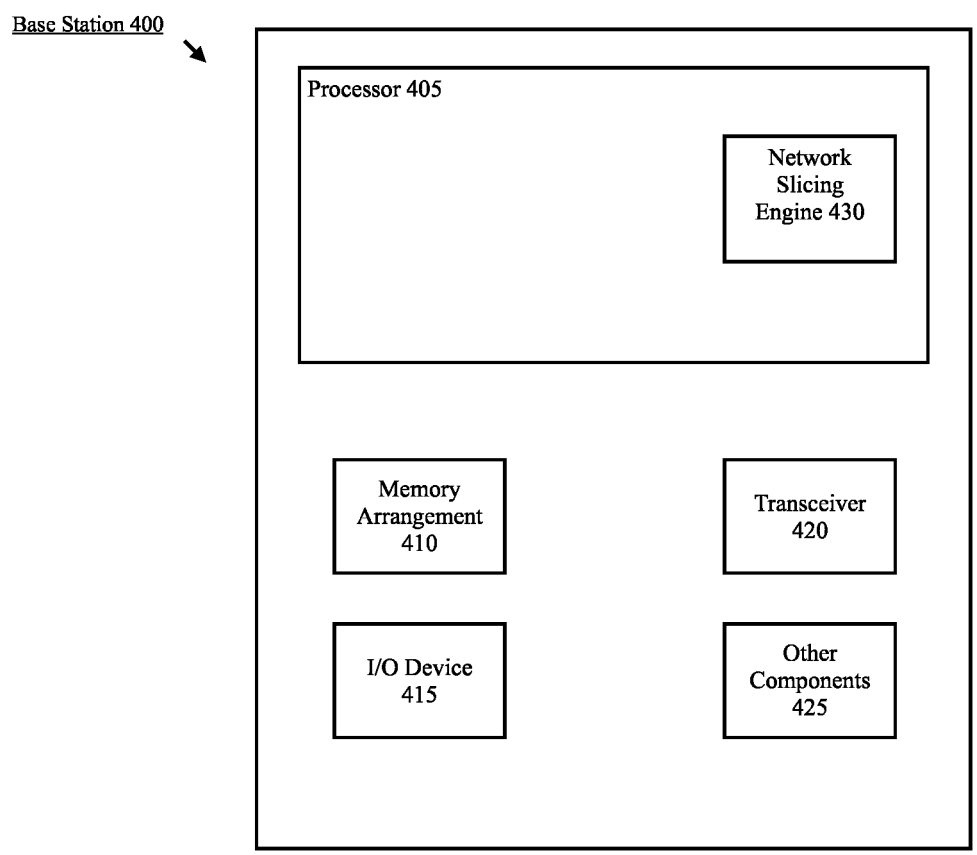
FIG. 4 shows an exemplary base station according to various exemplary embodiments.

FIG. 4 shows an exemplary base station 400 according to various exemplary embodiments. The base station 400 may represent the gNB 120A or any other access node through which the UE 110 may establish a connection and manage network operations.

The base station 400 may include a processor 405, a memory arrangement 410, an input/output (I/O) device 415, a transceiver 420, and other components 425. The other components 425 may include, for example, an audio input device, an audio output device, a battery, a data acquisition device, ports to electrically connect the base station 400 to other electronic devices, etc.

The processor 405 may be configured to execute a plurality of engines for the base station 400. For example, the engines may include a network slicing engine 430. The network slicing engine 430 may perform various operations related to enabling network slicing including, but not limited to, facilitating communication between the UE 110 and various network components (e.g., AMF 205, SMF 210, etc.).

The above noted engine 430 being an application (e.g., a program) executed by the processor 405 is only exemplary. The functionality associated with the engine 430 may also be represented as a separate incorporated component of the base station 400 or may be a modular component coupled to the base station 400, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 410 may be a hardware component configured to store data related to operations performed by the base station 400. The I/O device 415 may be a hardware component or ports that enable a user to interact with the base station 400. The transceiver 420 may be a hardware component configured to exchange data with the UE 110 and any other UE in the system 100. The transceiver 420 may operate on a variety of different frequencies or channels (e.g., set of consecutive frequencies). Therefore, the transceiver 420 may include one or more components (e.g., radios) to enable the data exchange with the various networks and UEs.

As mentioned above, a RA may comprise multiple tracking areas. However, each tracking area does not necessarily support the same network slices. Similarly, the RA may be configured with multiple AMFs, however, each AMF does not necessarily support the same network slices. Under conventional circumstances, the network may reject a requested network slice when it is not supported by the current tracking area or the serving AMF by providing a rejection cause indicating that a particular network slice (e.g., S-NSSAI) is not available in the current RA. This conventional rejection cause does not accurately reflect the actual deployment scenario of the UE 110. For example, the current tracking area may not support a requested S-NSSAI but there may be another tracking area within the RA that does support the requested S-NSSAI in the same tracking area. Similarly, the serving AMF may not support a requested S-NSSAI but there may be another AMF available that does support the requested S-NSSAI. Due to the rejection cause being applicable to the entire RA, the UE 110 does not attempt to register with the rejected S-NSSAI until the UE 110 moves out of the RA.

In one aspect, the exemplary embodiments introduce techniques for implementing network slice rejection at a tracking area level. These exemplary techniques may allow the UE 110 to avoid scenarios in which the UE 110 is located within a tracking area that supports a particular network slice but the UE 110 is unable to access the particular network slice.

Figure 5:
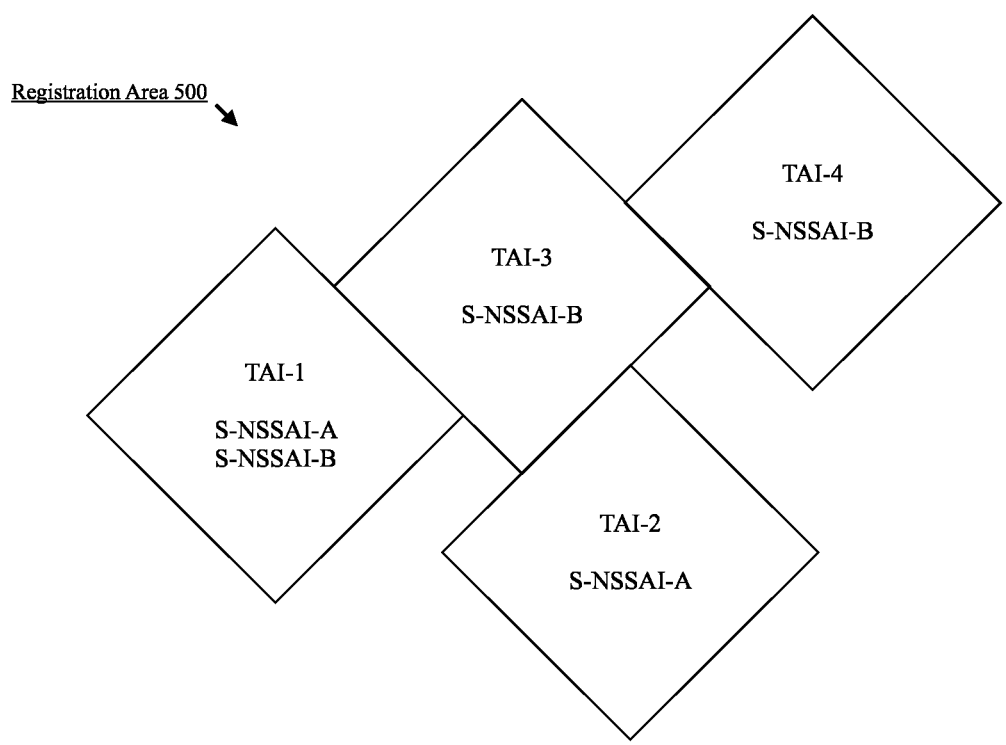
FIG. 5 shows an example of a registration area (RA) comprising multiple tracking areas according to various exemplary embodiments.

FIG. 5 shows an example of a registration area 500 comprising multiple tracking areas according to various exemplary embodiments. Each TAI may support different network slices. In this example, TAI-1 and TAI-2 support S-NSSAI-A and TAI-1, TAI-3 and TAI-4 support S-NSSAI-B. Throughout this description, any reference to "S-NSSAI-A" and "S-NSSAI-B" is merely provided to differentiate between two different network slices and it not intended to limit the exemplary embodiments in any way.

To provide an example of the issues referenced above within the context of the RA 500, consider a scenario in which the UE 110 is located within TAI-4 and transmits a registration request to the network. The registration request may comprise a request for S-NSSAI-A and S-NSSAI-B. In response, the UE 110 may receive a registration accept message indicating that S-NSSAI-B is allowed and S-NSSAI-A is rejected. The rejection cause may indicate that S-NSSAI-A is not available in the current RA 500. However, S-NSSAI-A may actually be available in other tracking areas, e.g., TAI-1 and TAI-2 which are part of the RA provided to the UE.

When the rejection cause for the rejected network slice indicates that a network slice is not available in a RA, the UE 110 may be configured to add the rejected S-NSSAI to the rejected NSSAI for the current RA (e.g., RA 500). In addition, the UE 110 may be configured to not attempt to use the S-NSSAI in the current registration area until a subsequent condition occurs such as, but not limited to, switching off the UE 110 and moving outside of the current RA. Thus, if the UE 110 moves to TAI-1 of RA 500 on which S-NSSAI-A is allowed, the UE 110 does not try to obtain service associated with S-NSSAI-A because TAI-1 and TAI-4 are part of the same RA and the rejection cause indicated that S-NSSAI-A is not available in the current RA 500.

The exemplary embodiments introduce a rejection cause that is specific to a tracking area. Throughout this description, this rejection cause may be referred to as "S-NSSAI non-service area" or "S-NSSAI not available in the current tracking area." However, the titles of these rejection causes are merely provided for illustrative purposes, different entities may refer to similar concepts by a different name.

In addition, the exemplary embodiments introduce a serving NSSAI TAI list. The serving NSSAI TAI list may be configured to include all TAIs of a public land mobile network (PLMN) in the RA that are allowed for a particular rejected network slice. For example, within the context of RA 500, the serving NSSAI TAI list may include an indication that S-NSSAI-A is supported by TAI-1 and TAI-2 and an indication that S-NSSAI-B is support by TAI-1, TAI-3 and TAI-4. Reference to a serving NSSAI TAI list is merely provided for illustrative purposes, different entities may refer to similar concepts by a different name.

Figure 6:
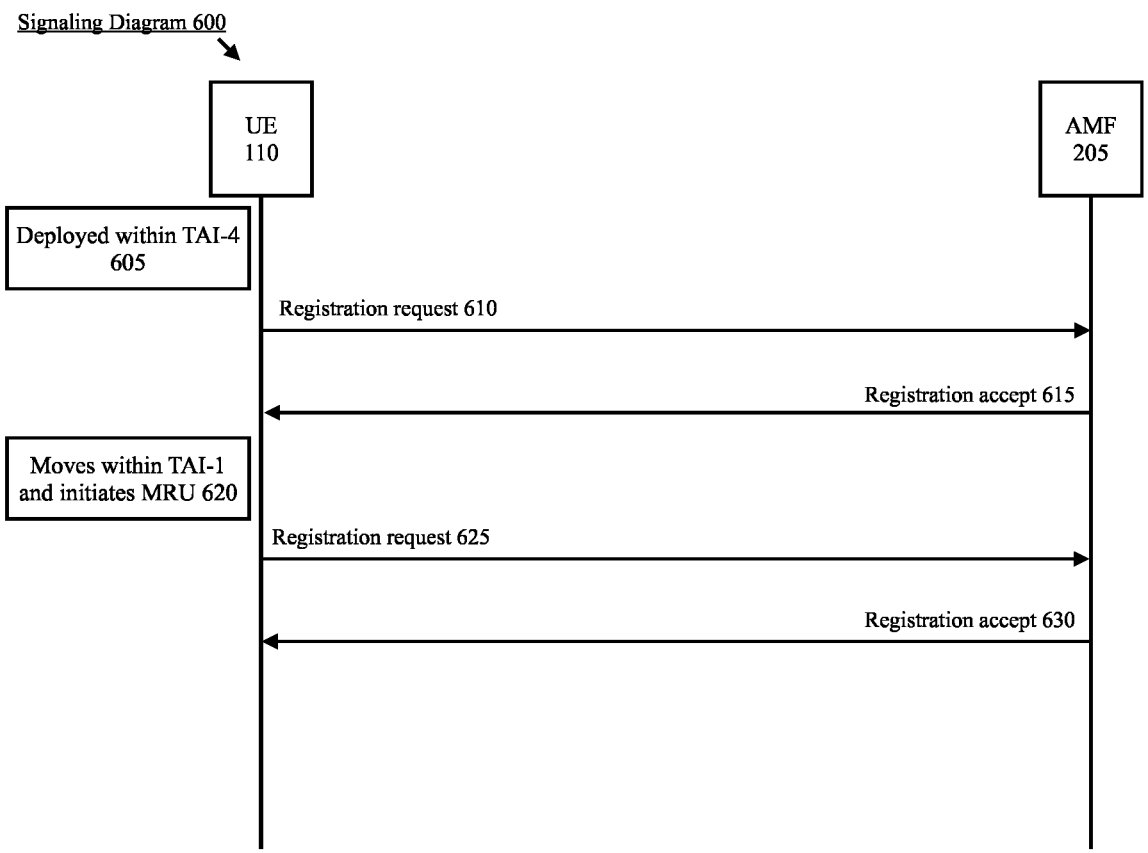
FIG. 6 shows a signaling diagram including an example of network slice rejection at a tracking area level.

FIG. 6 shows a signaling diagram 600 including an example of network slice rejection at a tracking area level. The signaling diagram 600 is described with regard to the network arrangements 100-200 of FIGS. 1-2, the UE 110 of FIG. 3 and the RA 500 of FIG. 5. The signaling diagram 600 includes the UE 110 and the AMF 205.

In 605, the UE 110 is deployed within TAI-4. In 610, the UE 110 transmits a registration request to the AMF 205. The registration request may include requested NSSAIs S-NSSAI-A and S-NSSAI-B. In this example, it is assumed that registration is successful.

In 615, the AMF 205 transmits a registration accept message to the UE 110. The registration accept message may include allowed NSSAI and rejected NSSAI. For each rejected S-NSSAI there may be an information element comprising one or more bits indicating a cause value. The cause value may be associated with the rejection cause "S-NSSAI non-service area" or "S-NSSAI not available in the current tracking area." Thus, the UE 110 may determine the rejection cause based on its association with a cause value.

FIG. 7 shows a table 700 comprising cause values and corresponding rejection causes for rejected NSSAI. The table 700 may be similar to the extended rejected NSSAI information element table provided in 3GPP standards except for the rejection cause "S-NSSAI non-service area" or "S-NSSAI not available in the current tracking area." The table 700 shows one example of a cause value in bits (e.g., 0011) that may be used to indicate that a S-NSSAI is not allowed in a particular TAI. However, the exemplary embodiments are not limited to this cause value and may utilize any cause value or any other appropriate type of indication to convey to the UE 110 that a requested S-NSSAI is not allowed within a TAI.

Returning to the signaling diagram 600 of FIG. 6, in some embodiments, the registration accept message may also include a serving NSSAI list for the rejected network slice. As mentioned above, the serving NSSAI TAI list may be configured to include all TAIs of a PLMN within the RA that are allowed for a particular rejected network slice. Within the context of the RA 500, the serving NSSAI list may indicate that S-NSSAI-A is allowed in TAI-1 and TAI-2.

In 620, the UE 110 moves to TAI-1 and initiates a mobility registration update (MRU). Based on the rejection cause and/or serving NSSAI list that may be received in the registration accept message, the UE 110 knows that other TAIs within the RA may allow the network slice rejected in TAI-4 (e.g., S-NSSAI-A). Thus, the UE 110 may initiate the MRU despite not moving outside of the RA 500. This MRU allows the UE 110 to attempt to access a network slice that was not allowed within a different TAI.

In 625, the UE 110 transmits a registration request to the AMF 205. The registration request may include requested NSSAIs S-NSSAI-A and S-NSSAI-B. In 630, the UE 110 receives a registration accept message. Unlike the previous registration accept message received in TAI-4, the registration accept message does not contain rejected NSSAI because the requested NSSAI are both allowed in TAI-1. Thus, the UE 110 may be able to access network services associated with S-NSSAI-A while located within TAI-1 of the RA 500.

In another aspect, the exemplary embodiments introduce techniques for implementing network slice rejection at an AMF level. These exemplary techniques may allow the UE 110 to avoid scenarios in which the UE 110 is located within a tracking area that supports a particular network slice but the UE 110 is unable to access the particular network slice via its serving AMF.

There may be multiple AMFs available to a RA and each AMF may support different network slices. As mentioned above, under conventional circumstances, when the serving AMF does not support a requested network slice, the rejection cause may be that the network slice is not allowed within the current RA. However, this does not accurately reflect the actual deployment scenarios because a different AMF may support the rejected network slice.

Figure 8:
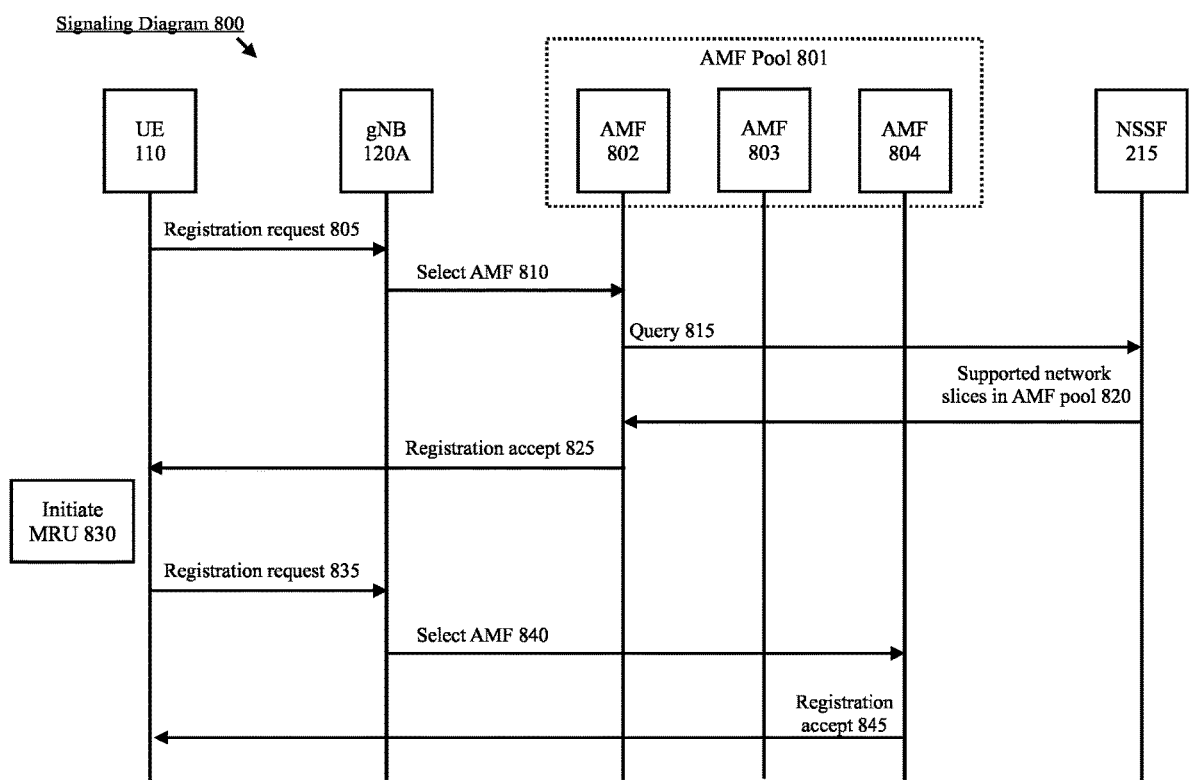
FIG. 8 shows a signaling diagram including an example of network slice rejection at an access and mobility management function (AMF) level.

FIG. 8 shows a signaling diagram 800 including an example of network slice rejection at an AMF level. The signaling diagram 800 is described with regard to the network arrangements 100-200 of FIGS. 1-2 and the UE 110 of FIG. 3.

The signaling diagram 800 includes the UE 110, the gNB 120A and the NSSF 215. In addition, the signaling diagram shows an AMF pool 801 comprising three AMFs 802-804. Throughout this description, the term "AMF pool" generally refers to a set of AMFs that may be configured as a serving AMF for the UE 110 relative to a particular RA. However, reference to an AMF pool comprising three AMFs is only an example. In an actual deployment scenario, the AMF pool may comprise any appropriate number of AMFs.

In this example, AMF 802 is configured to support S-NSSAI-A and S-NSSAI-B, AMF 803 is configured to support S-NSSAI-B and S-NSSAI-C and AMF 804 is configured to support S-NSSAI-A and S-NSSAI-C. Like the examples provided above, reference to "S-NSSAI-A," "S-NSSAI-B" and "S-NSSAI-C" is provided to differentiate between different network slices and is not intended to limit the exemplary embodiments in any way.

In 805, the UE 110 transmits a registration request to the gNB 120. The registration request may include requested NSSAI S-NSSAI-A, S-NSSAI-B and S-NSSAI-C. It may be beneficial for the UE 110 to indicate a preference or priority corresponding to the requested network slices. This may assist the network in determining which AMF is appropriate for the UE 110. In this example, the UE 110 indicates that S-NSSAI-A is prioritized over the other network slices and S-NSSAI-B is prioritized over S-NSSAI-C. The UE 110 may order the requested network slices in accordance with the UE 110 preference or the priority may be indicated to the network in any appropriate manner.

In 810, the gNB 120A selects an AMF from the AMF pool 801. In this example, the gNB 120A selects AMF 802 based on the preferences indicated by the UE 110 in the registration request, whether the UE 110 is allowed to access the requested network slices and/or which network slices are supported by the AMF pool 801. Although not shown in the signaling diagram 800, the gNB 120A may communicate with one or more AMFs in the AMF pool 801 and/or any other appropriate network entity to select the appropriate AMF. In some embodiments, the selection may be performed downstream by a different network entity and provided to the gNB 120A. The exemplary embodiments may apply to this AMF selection being performed by any appropriate network component on any appropriate basis.

In some embodiments, in addition to or instead of considering the network slice priority indicated by the UE 110, the network may choose the AMF that is able to provide access to the most number of slices in the requested NSSAI. In other embodiments, the UE 110 may indicate that one or more network slices are required to be supported by the selected AMF. In further embodiments, the UE 110 may indicate whether it prefers to get access to prioritized network slices or the most number of network slices.

In 815, the AMF 802 queries the NSSF 215 for available network slices at other AMFs in the AMF pool 801. In 820, the NSSF 215 transmits an indication of supported network slices by each AMF of the AMF pool 801. In this example, the NSSF 215 may indicate to the AMF 802 that AMF 803 supports S-NSSAI-B and S-NSSAI-C and AMF 804 support S-NSSAI-A and S-NSSAI-C.

In 825, the AMF 802 transmits a registration accept message to the UE 110. The registration accept message may include allowed NSSAI, rejected NSSAI with an indication of a rejection cause and/or the network slices supported by each AMF in the AMF pool 801. Thus, the AMF 802 may indicate to the UE 110 network slices that are not supported by the serving AMF but are supported by the other AMFs within the AMF pool 801.

As indicated above, the AMF 802 may indicate to the UE 110 the available slice combinations in the AMF pool 801 per AMF. In this example this information is provided to the UE 110 in a registration accept message. In other embodiments, this information may be provided to the UE 110 in a registration reject message, configuration update command messages or in any other appropriate type of message. In some embodiments, the message may contain an information element indicating the available S-NSSAI combinations and/or supported network slices.

The exemplary embodiments introduce a rejection cause that enables the network to indicate that a rejected network slice is not available in the serving AMF. This may indicate to the UE 110 that the UE 110 is permitted to request the rejected network slice again within this RA. As mentioned above, under conventional circumstances, the network may indicate to the UE 110 that the rejected NSSAI is not available in the RA even if there are other AMFs capable of providing access to rejected NSSAI within the RA.

Figure 9:
FIG. 9 shows a table comprising cause values and corresponding rejection causes for rejected NSSAI.

FIG. 9 shows a table 900 comprising cause values and corresponding rejection causes for rejected NSSAI. The table 900 may be similar to the extended rejected NSSAI information element table provided in 3GPP standards except for the rejection cause "S-NSSAI not available in the current AMF." The table 900 shows one example of a cause value in bits (e.g., 0011) that may be used to indicate that a S-NSSAI is not allowed in a particular AMF. However, the exemplary embodiments are not limited to this cause value and may utilize any cause value or any other appropriate type of indication to convey to the UE 110 that a requested S-NSSAI is not allowed within an AMF.

During operation, the UE 110 may want to use network slice that is not allowed on the serving AMF 802, e.g., S-NSSAI-C. Based on the rejection cause and/or supported combination of network slices on each AMF within the AMF pool 801 received during the registration procedure, the UE 110 is aware that access to S-NSSAI-C is allowed on a different AMF within the AMF pool 801.

In 830, the UE 110 initiates MRU. When the UE 110 wants to access a network slice that has been rejected with the rejection cause "not available in the serving AMF," the UE 110 initiates MRU so that the AMF that supports the desired network slice is selected to serve the UE 110.

In 835, the UE 110 transmits a registration request to the gNB 120A. In this example, the registration request may include requested NSSAI with S-NSSAI-C which was rejected during the previous registration procedure within this RA. Like in the registration request referenced above in 805, the UE 110 may indicate a priority or preference corresponding to the requested network slice or may indicate that a particular network slice is required to be allowed on the AMF that is to be selected by the network to serve the UE 110. Thus, despite not traveling outside of the RA or powering off, the UE 110 initiates MRU to access a different network slice that was previously rejected.

In 840, the gNB 120A selects AMF 804 because AMF 804 allows the requested network slice. Alternatively, when the serving AMF 802 receives the registration request associated with the MRU comprising a requested network slice that is not supported by the serving AMF but is supported by another AMF in the AMF pool 801, the AMF may be triggered to start an AMF reallocation procedure. In 845, the AMF 804 transmits a registration accept message to the UE 110 indicated that the requested NSSAI is allowed.

In another aspect, the exemplary embodiments introduce mechanisms for transferring an existing PDU session from a first network slice to a second different network slice within 3GPP access and in the same PLMN (or equivalent PLMN). Some of the exemplary mechanisms are described below with regard to a scenario in which the UE 110 is triggered to dynamically register an existing PDU session to a network slice that is different than a currently configured network slice. The UE 110 is triggered to register to this new network slice while the user is actively using the corresponding application running on the UE 110 (e.g., streaming video, cloud gaming, extended reality (XR), etc.). However, the exemplary embodiments are not limited to this type of scenario and may apply to any scenario in which the UE 110 is triggered to attempt to register to a network slice for an existing PDU session that is different than a currently configured network slice.

Figure 10:
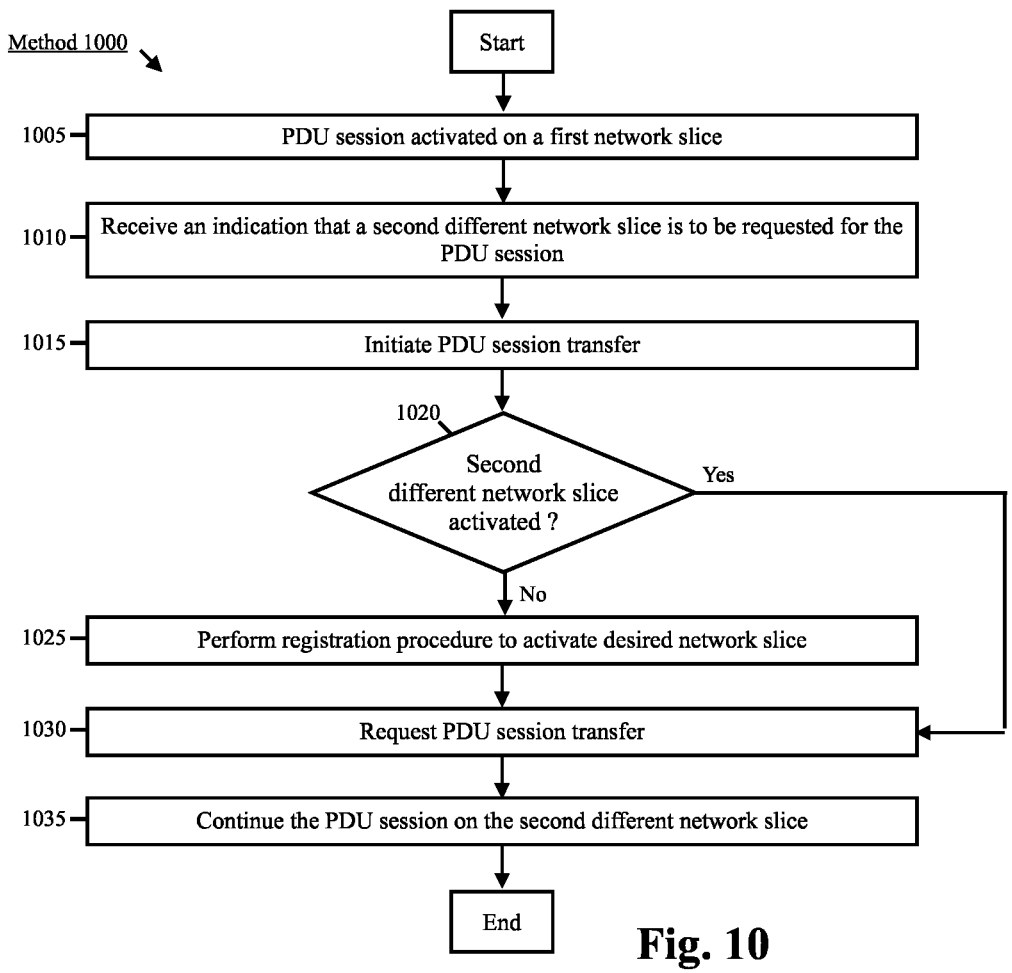
FIG. 10 shows a method for transferring an existing packet data unity (PDU) session from a first network slice to a second different network slice according to various exemplary embodiments.

FIG. 10 shows a method 1000 for transferring an existing PDU session from a first network slice to a second different network slice according to various exemplary embodiments. The method 1000 provides a general overview of the process of transferring an existing PDU session from the perspective of the UE 110. Additional details regarding network side operations associated with a PDU session transfer are provided below with regard to signaling diagrams 1100-1400 of FIGS. 11-14.

Initially, consider a scenario in which the UE 110 is registered to a network and configured with an allowed S-NSSAI comprising S-NSSAI-A. In addition, an application running on the UE 110 is configured to access a data network (e.g., the Internet 140) and utilize S-NSSAI-A. As will be described in more detail below, the exemplary mechanisms enable a transfer of a PDU session from a first network slice (e.g., S-NSSAI-A) to a second different network slice (e.g., S-NSSAI-B). Like in the examples provided above, any reference to "S-NSSAI-A" and "S-NSSAI-B" is merely provided to differentiate between two different network slices and it not intended to limit the exemplary embodiments in any way.

In 1005, a PDU session is activated on a first network slice (e.g., S-NSSAI-A). The PDU session may be identified by a PDU session ID. In this example, the PDU session ID is referred to as "PDU session ID 1." The PDU session may connect the UE 110 and a server hosted on a data network, e.g., the Internet 140, etc. In this example, the PDU session corresponds to a gaming application running on the UE 110.

In 1010, the UE 110 receives an indication that a second different network slice is to be requested for the PDU session. As will be described below with regard to 1015, the indication in 1010 triggers the UE 110 to initiate the PDU session transfer to a second different network slice (e.g., S-NSSAI-B). To provide an example, during operation of the gaming application, the user may decide to change their type of service. This may include purchasing or unlocking a premium service provided by the gaming application. From a network perspective, this premium service may be provided by a different network slice that provides a different guaranteed quality of service (QoS). However, this example is merely provided for illustrative purposes. The exemplary embodiments are not limited to a PDU session transfer that occurs within this context. Network slices may be used in a wide variety of different applications and the exemplary embodiments may apply to any scenario in which a UE is triggered to request a network slice for an existing PDU session.

Like the example provided above, the indication provided in 1010 may be received via user input at the UE 110, e.g., the user selects the premium service. In other embodiments, the corresponding application running on the UE 110 may trigger the UE 110 to request the new network slice. For example, when a user's profile or avatar reaches a certain level or obtains a certain status relative to the gaming application, the gaming application may provide the indication in 1010 without any explicit user selection. In other embodiments, the indication in 1010 may be received from the network side. For example, a server at the other remote endpoint of the PDU session, a third-party server or a network component may send a signal to the UE 110 indicating that a new network slice may be requested. In other examples, instead of upgrading to better or premium service, the PDU session transfer may be performed to downgrade from a premium service. However, the examples provided above are not intended to limit the exemplary embodiments in any way. The exemplary embodiments may utilize any appropriate trigger condition for the UE initiated PDU session transfer.

In 1015, the UE 110 initiates the PDU session transfer from the first network slice to the second different network slice. In 1020, the UE 110 determines whether the desired network slice is activated at the UE 110. If the desired network slice is not activated, the method 1000 continues to 1025. In 1025, the UE 110 performs a registration procedure to activate the desired network slice at the UE 110. Once activated, the method 1000 continues to 1030.

Returning to 1020, if the desired network slice is already activated, the method 1000 continues to 1030. In 1030, the UE 110 transmits a request to transfer the PDU session from the first network slice to the second different network slice. In some embodiments, the signal in 1030 may be a PDU session modification request that is enhanced to enable the UE 110 to request a change in S-NSSAI associated with the PDU session (e.g., PDU session ID 1). An example of this is shown below with regard to the signaling diagram 1100 of FIG. 11. In other embodiments, the signal in 1030 may be a PDU session establishment request enhanced to support a handover of the PDU session from one S-NSSAI to another S-NSSAI on the same access. An example of this is shown below with regard to the signaling diagram 1200 of FIG. 12.

In 1035, the UE 110 and network continue with the same PDU session on the second different network slice (e.g., S-NSSAI-B). Subsequently, the method 100 ends.

There may be a scenario in which the maximum number of allowed network slices is already configured when the UE 110 (or the network) is triggered to initiate the PDU session transfer and the desired network slice is not configured as an allowed network slice. If activating the desired network slice would exceed a network slice quota, the UE or the network may remove a network slice from the allowed network slice configuration.

In some embodiments, multiple combinations of PDU sessions and network slices may be kept activate for an application. This may allow the user to switch between different services in a seamless manner. For example, a video streaming application may use a first PDU session and network slice combination for a first type of video quality, a second PDU session and network slice combination for a second type of video quality and a third PDU session and network slice combination for a third type of video quality. All three combinations may be activated simultaneously which may allow the user to switch between the different video qualities in a seamless manner.

In some embodiments, the PDU session transfer may be initiated by the network. Specific examples of network initiated PDU session transfer is shown below with regard to signaling diagrams 1300-1400.

Figure 11:
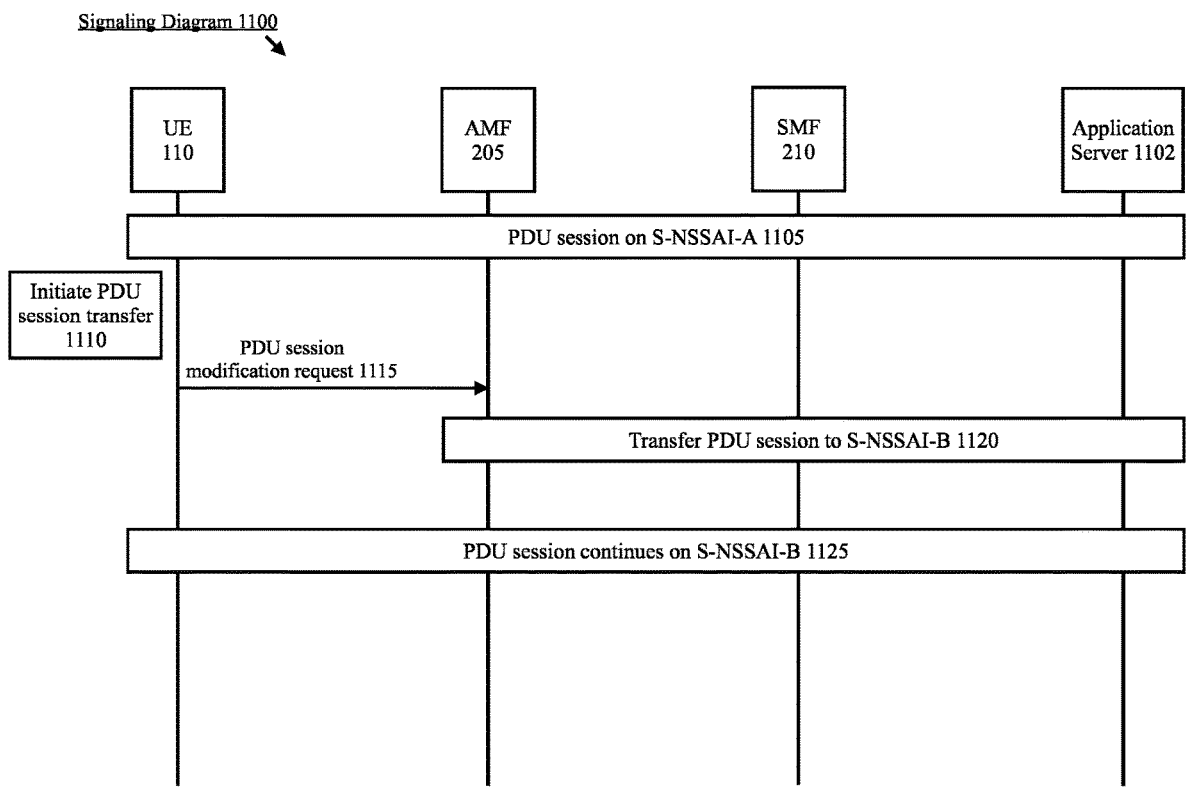
FIG. 11 shows a signaling diagram for UE initiated PDU session modification according to various exemplary embodiments.

FIG. 11 shows a signaling diagram 1100 for UE initiated PDU session modification according to various exemplary embodiments. The signaling diagram 1100 includes the UE 110, the AMF 205, the SMF 210 and an application server 1102. The signaling diagram 100 will be described with regard to the network arrangements 100-200 of FIGS. 1-2 and the UE 110 of FIG. 3.

In 1105, a PDU session is established between the UE 110 and the application server 1102. The PDU session is established on a first network slice, e.g., S-NSSAI-A.

Within the context of the network arrangements 100, the application server 1102 may be hosted on the Internet 140. However, the exemplary embodiments are not limited to this arrangement and may apply to any type of server deployed within any appropriate type of data network.

In 1110, the UE 110 is triggered to initiate the PDU session transfer. As indicated above, in some embodiments, the UE 110 may receive a signal from the application server 1102 indicating that the user's subscription to the corresponding service has changed, e.g., a "normal" subscription to a "premium" subscription or vice versa. In other embodiments, the UE 110 may be triggered to initiate the transfer based on user input received at the UE 110. However, the exemplary embodiments are not limited to the example trigger conditions mentioned above and may utilize any appropriate type of trigger condition to initiate a transfer (or handover) of a PDU session from one network slice to another network slice.

In this example it is assumed that the desired network slice (e.g., S-NSSAI-B) is already activated at the UE 110 prior to 1110. However, as indicated above in the method, there may be a scenario in which the desired network slice is not activated at the UE 110 when trigger condition for the PDU session transfer occurs. In this type of scenario, the UE 110 may initiate a registration procedure to activate the desired network slice (e.g., S-NSSAI-B). This may include AMF reallocation where the existing PDU session information is transferred to a new AMF. In addition, this may also include the network providing new UE route selection policy (USRP) rules indicating that S-NSSAI-B is the preferred network slice over S-NSSAI-A for this service.

In 1115, the UE 110 transmits a PDU session modification request to the AMF 205. To enable the PDU session transfer the exemplary embodiments introduce a PDU session modification request that indicates that the UE 110 is requesting a change of the network slice that is associated with a particular PDU session. For example, the request may explicitly or implicitly refer to a particular PDU session ID and/or a particular desired S-NSSAI.

In 1120, the PDU session modification procedure is successful and the network transfers the existing PDU session context to the desired network slice (e.g., S-NSSAI-B) while ensuring IP continuity.

In 1125, the PDU session continues on the second different network slice (e.g., S-NSSAI-B). As mentioned above, the network slice may have different QoS parameters. Thus, before the modification procedure the PDU session may be subject to a first set of one or more QoS parameters and after the successful PDU session modification procedure, the same PDU session may be subject to a second different set of one or more QoS parameters.

Figure 12:
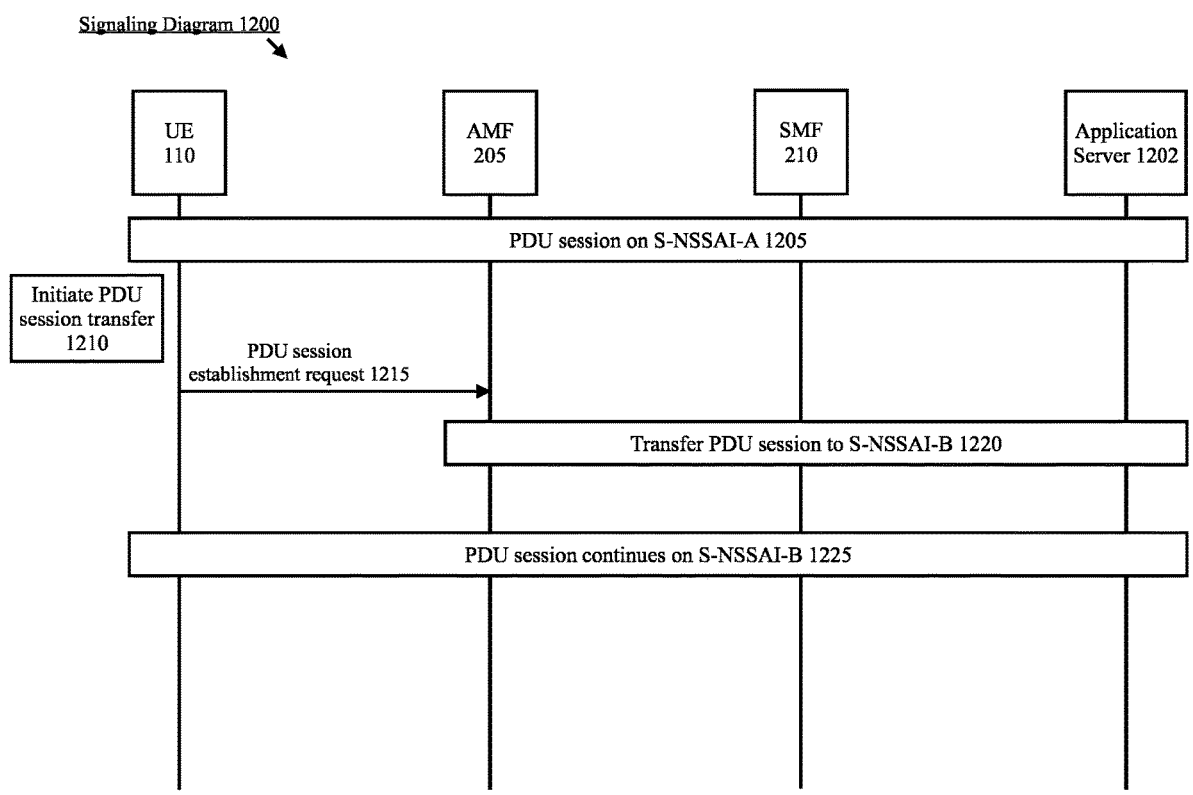
FIG. 12 shows a signaling diagram for UE initiated PDU session establishment with handover according to various exemplary embodiments.

FIG. 12 shows a signaling diagram 1200 for UE initiated PDU session establishment with handover according to various exemplary embodiments. The signaling diagram 1200 includes the UE 110, the AMF 205, the SMF 210 and an application server 1202. The signaling diagram 1200 will be described with regard to the network arrangements 100-200 of FIGS. 1-2 and the UE 110 of FIG. 3.

In 1205, a PDU session is established between the UE 110 and the application server 1202. The PDU session is established on a first network slice, e.g., S-NSSAI-A. Like the example provided in FIG. 11, the application server 1202 may be hosted on the Internet 140. However, the exemplary embodiments are not limited to this arrangement and may apply to any type of server deployed within any appropriate type of data network.

In 1210, the UE 110 is triggered to initiate the PDU session transfer. As indicated above, in some embodiments, the UE 110 may receive a signal from the application server 1202 indicating that the user's subscription to the corresponding service has changed, e.g., a "normal" subscription to a "premium" subscription or vice versa. In other embodiments, the UE 110 may be triggered to initiate the transfer based on user input received at the UE 110. However, the exemplary embodiments are not limited to the example trigger conditions mentioned above and may utilize any appropriate type of trigger condition to initiate a transfer (or handover) of a PDU session from one network slice to another network slice.

In this example, like the example shown in FIG. 11, it is assumed that the desired network slice (e.g., S-NSSAI-B) is already activated at the UE 110 prior to 1210. However, there may be a scenario in which the desired network slice is not activated at the UE 110 when trigger condition for the PDU session transfer occurs. In this type of scenario, the UE 110 may initiate a registration procedure to activate the desired network slice (e.g., S-NSSAI-B). This may include AMF re-allocation where the existing PDU session information is transferred to a new AMF. In addition, this may also include the network providing new USRP rules indicating that S-NSSAI-B is the preferred network slice over S-NSSAI-A for this service.

In 1215, the UE 110 transmits a PDU session establishment request to the AMF 205. To enable the PDU session transfer the exemplary embodiments introduce a PDU session establishment request that indicates that the UE 110 is requesting a handover of the context of the existing PDU session from one network slice (e.g., S-NSSAI-A) to a different network slice (e.g., S-NSSAI-B). For example, the request may explicitly or implicitly refer to a particular PDU session ID and/or a particular desired S-NSSAI.

In 1220, the PDU session establishment procedure is successful and the network transfers the existing PDU session context to the desired network slice (e.g., S-NSSAI-B) while ensuring IP continuity. A new PDU session is not created. Instead, the existing PDU session is transferred to the desired network slice.

In 1225, the same PDU session continues on the second different network slice (e.g., S-NSSAI-B). As mentioned above, the different network slice may have different QoS parameters. Thus, before the modification procedure the PDU session may be subject to a first set of one or more QoS parameters and after the successful PDU session modification procedure, the same PDU session may be subject to a second different set of one or more QoS parameters.

The examples provided above in signaling diagrams 1100-1200 described examples of a PDU session transfer initiated by the UE 110. The examples provided below with regard to the signaling diagrams 1300-1400 will describe examples of a network initiated PDU session transfer.

Figure 13:
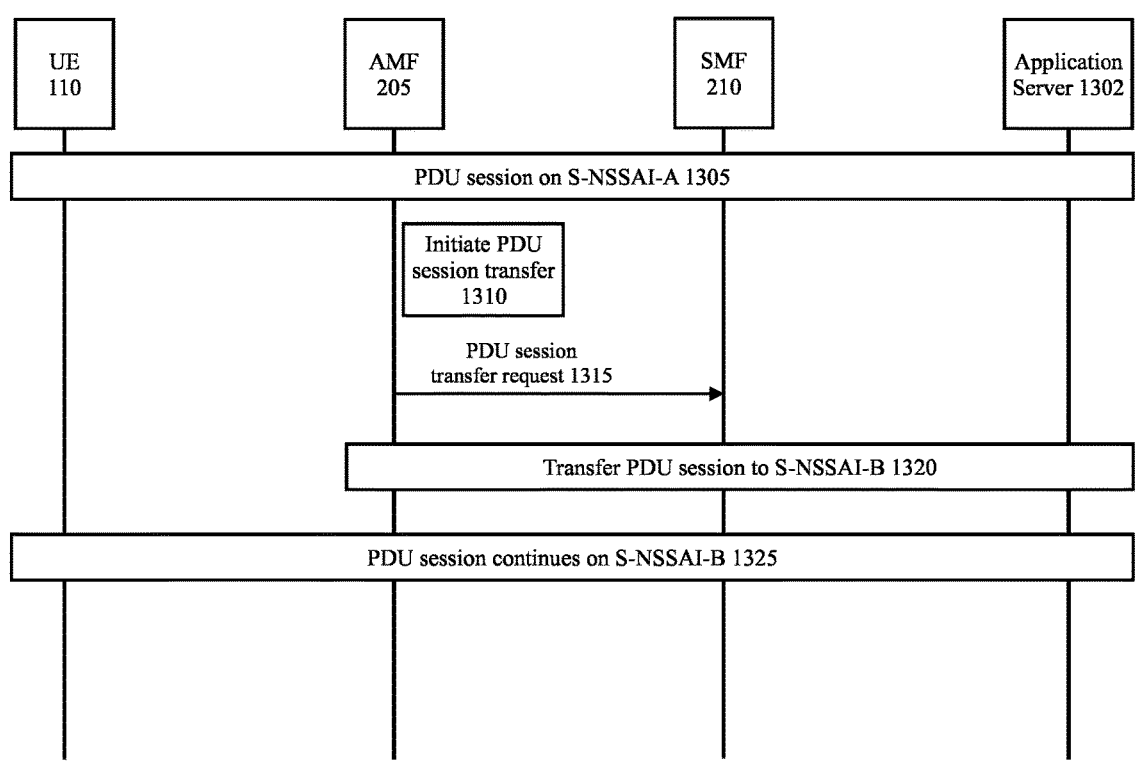
FIG. 13 shows a signaling diagram for a network initiated PDU session modification procedure according to various exemplary embodiments.

FIG. 13 shows a signaling diagram 1300 for a network initiated PDU session modification procedure according to various exemplary embodiments. The signaling diagram 1300 includes the UE 110, the AMF 205, the SMF 210 and an application server 1302. The signaling diagram 1300 will be described with regard to the network arrangements 100-200 of FIGS. 1-2 and the UE 110 of FIG. 3.

In 1305, a PDU session is established between the UE 110 and the application server 1302. The PDU session is established on a first network slice, e.g., S-NSSAI-A. Like the examples provided above, the application server 1302 may be hosted on the Internet 140. However, the exemplary embodiments are not limited to this arrangement and may apply to any type of server deployed within any appropriate type of data network.

In 1310, the AMF 205 is triggered to initiate the PDU session transfer. The application server 1302 may identify the UE 110 to the AMF 205 by using a generic public subscription identifier (GPSI) or any other appropriate parameter. To provide an example, the AMF 205 may receive a signal from the application server 1302 indicating that the user's subscription to the corresponding service has changed, e.g., a "normal" subscription to a "premium" subscription or vice versa. However, the exemplary embodiments are not limited to the example trigger condition mentioned above and may utilize any appropriate type of trigger condition to cause the AMF to initiate a transfer (or handover) of a PDU session from one network slice to another network slice.

In this example, it is assumed that the desired network slice (e.g., S-NSSAI-B) is already activated for the UE 110. The signaling diagram 1400 provides an example of a network initiated PDU session transfer where the desired network slice is not already activated for the UE 110.

In 1315, the AMF 205 transmits a request to the SMF 210 for the PDU session transfer. In 1320, a PDU session modification procedure is performed to transfer the PDU session from the first network slice to the second different network slice. In 1325, the same PDU session continues on the second different network slice (e.g., S-NSSAI-B).

If SMF re-allocation is not needed, the SMF 210 triggers PDU session modification to modify the existing PDU session on the first network slice (e.g., S-NSSAI-A) by transferring the PDU session to the second different network slice (e.g., S-NSSAI-B). Alternatively, the SMF 210 may trigger PDU session modification by indicating that the existing PDU session ID associated with currently configured network slice (e.g., S-NSSAI-A) is to be used for reactivation of the PDU session on the desired network slice (e.g., S-NSSAI-B).

If SMF re-allocation is needed, the current SMF 210 may initiate a PDU session release by indicating that the existing PDU session ID associated with the first network slice (e.g., S-NSSAI-A) is to be used for reactivation of the PDU session on the desired network slice (e.g., S-NSSAI-B). In this example, the UE 110 and the new SMF may activate the existing PDU session on the desired network slice.

As mentioned above, the different network slices may have different QoS parameters. Thus, before the modification procedure the PDU session may be subject to a first set of one or more QoS parameters and after the successful PDU session modification procedure, the same PDU session may be subject to a second different set of one or more QoS parameters.

Figure 14:
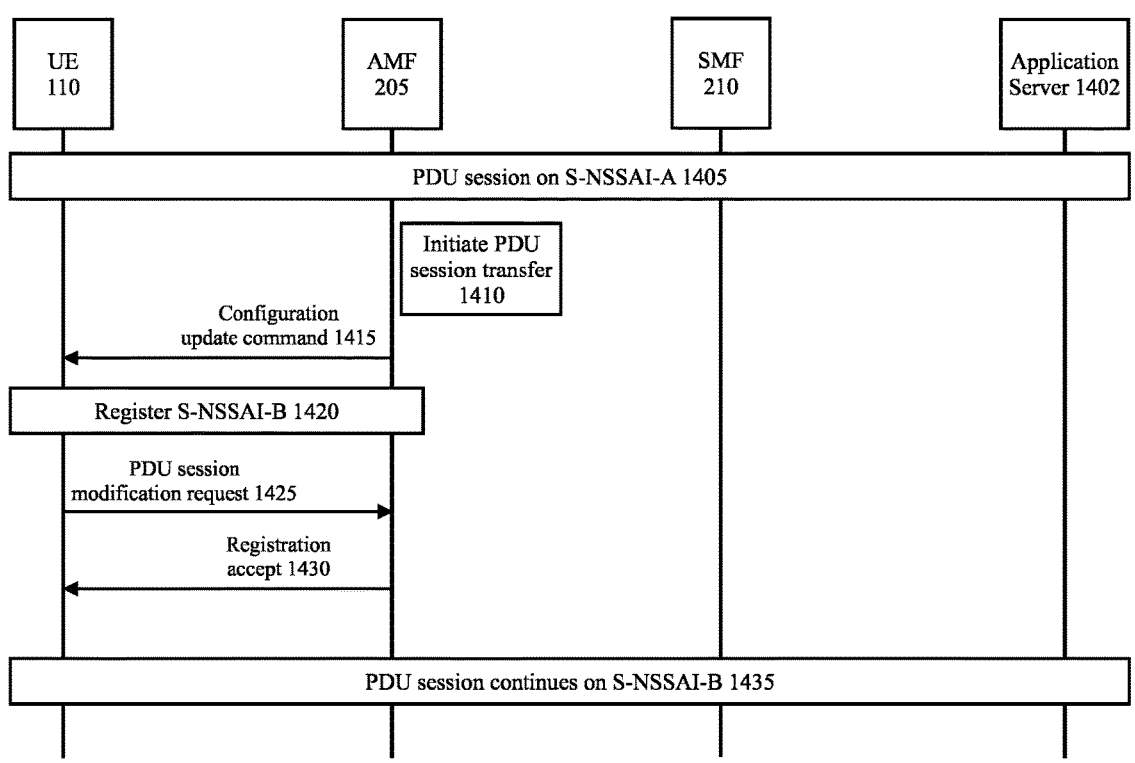
FIG. 14 shows a signaling diagram for a network initiated PDU session modification procedure according to various exemplary embodiments.

FIG. 14 shows a signaling diagram 1400 for a network initiated PDU session modification procedure according to various exemplary embodiments. The signaling diagram 1400 includes the UE 110, the AMF 205, the SMF 210 and an application server 1402. The signaling diagram 1400 will be described with regard to the network arrangements 100-200 of FIGS. 1-2 and the UE 110 of FIG. 3.

In 1405, a PDU session is established between the UE 110 and the application server 1402. The PDU session is established on a first network slice, e.g., S-NSSAI-A. Like the examples provided above, the application server 1402 may be hosted on the Internet 140. However, the exemplary embodiments are not limited to this arrangement and may apply to any type of server deployed within any appropriate type of data network.

In 1410, the AMF is triggered to initiate the PDU session transfer in response to a signal received from the application server 1402. The application server 1402 may identify the UE 110 to the AMF 205 by using a GPSI or any other appropriate parameter. To provide an example, the AMF 205 may receive a signal from the application server 802 indicating that the user's subscription to the corresponding service has changed, e.g., a "normal" subscription to a "premium" subscription or vice versa. However, the exemplary embodiments are not limited to the example trigger condition mentioned above and may utilize any appropriate type of trigger condition to cause the AMF 205 to initiate a transfer (or handover) of a PDU session from one network slice to another network slice.

In this example, it is assumed that the desired network slice (e.g., S-NSSAI-B) is not activated for the UE 110. This is in contrast to the signaling diagram 1300 where the desired network slice is already activated.

Since the desired network slice is not activated at the UE 110, in 1415, the AMF 205 transmits a configuration update command to the UE 110 which triggers the UE 110 to initiate activation of the desired slice. In some embodiments, the configuration update command may be configured to include an indication as to whether the UE 110 can activate the desired network slice without sending an indication of the desired network slice in the requested NSSAI.

In 1420, the UE 110 initiates a registration procedure with the AMF 205 to activate the desired network slice. Typically, activation of a network slice is initiated by the UE 110. Thus, when the desired network slice is not activated, the AMF 205 triggers the UE 110 to initiate registration. Although not shown in the signaling diagram 1400, AMF reallocation may be performed to activate the desired network slice and the existing PDU session information is transferred to a new AMF.

Once the registration is complete and the desired network slice is activated at the UE 110, in 1425, the UE 110 transmits a PDU session modification request to transfer the PDU session to the desired network slice to the AMF 205. Although not shown in the signaling diagram 1400, SMF reallocation may be performed to activate the desired network slice and the existing PDU session information is transferred to the new SMF.

In 1430, the AMF 205 transmits a registration accept message to the UE 110. The registration accept message may be configured to include an information element indicating the change in the PDU session association from the first network slice to the second different network slice.

In 1435, the same PDU session continues on the second different network slice (e.g., S-NSSAI-B). As mentioned above, the different network slice may have different QoS parameters. Thus, before the modification procedure the PDU session may be subject to a first set of one or more QoS parameters and after the successful PDU session modification procedure, the same PDU session may be subject to a second different set of one or more QoS parameters.

EXAMPLES

In a first example, a processor of a user equipment (UE) is configured to perform operations, comprising establishing a packet data unit (PDU) session on a first network slice, determining that a PDU session transfer from the first network slice to a second different network slice is to be performed and continuing the PDU session on the second different network slice.

In a second example, the processor of the first example, the operations further comprising initiating, prior to the PDU session transfer, a registration procedure to activate the second different network slice.

In a third example, the processor of the second example, wherein the initiating the registration procedure is triggered in response to an indication received from a remote server.

In a fourth example, the processor of the second example, wherein the initiating the registration procedure is triggered in response to user input at the UE.

In a fifth example, the processor of the second example, wherein the initiating the registration procedure is triggered by a configuration update command received from a serving access and mobility management function (AMF).

In a sixth example, a user equipment (UE) comprises a transceiver configured to communicate with a network and a processor communicatively coupled to the transceiver and configured to perform operations comprising transmitting a first registration request to a network, receiving a registration accept message in response to the first registration request comprising a rejected network slice and an indication of a rejection cause corresponding to the rejected network slice and transmitting a second registration request to the network comprising a requested network slice, wherein the requested network slice and the rejected network slice are a same network slice.

In a seventh example, a user equipment (UE) comprises a transceiver configured to communicate with a network and a processor communicatively coupled to the transceiver and configured to perform operations comprising establishing a packet data unit (PDU) session on a first network slice, determining that a PDU session transfer from the first network slice to a second different network slice is to be performed and continuing the PDU session on the second different network slice.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

We claim:

1. A processor of a user equipment (UE) configured to perform operations comprising:
   generating for transmission to an access and mobility function (AMF) of a fifth generation (5G) network, a first registration request;
   receiving a registration accept message in response to the first registration request comprising a rejected network slice and an indication of a rejection cause corresponding to the rejected network slice indicating that the rejected network slice is not allowed in a first tracking area of a registration area;
   initiating a mobility registration update (MRU) based on the registration accept message and
   generating, for transmission to the AMF, a second registration request comprising a requested network slice, wherein the requested network slice and the rejected network slice are a same network slice and wherein the UE transmits the second registration request from a second tracking area of the registration area after initiating the MRU.

2. The processor of claim 1, wherein the UE is deployed within a same registration area when receiving the registration accept message and transmitting the second registration request.

3. The processor of claim 1, wherein the rejection cause is specific to the first tracking area of the registration area.

4. The processor of claim 3, wherein the rejection cause is indicated using an extended rejected network slice selection assistance information (NSSAI) information element.

5. The processor of claim 1, the operations further comprising:
receiving, prior to transmitting the second registration request, an indication of one or more tracking area identities (TAIs) within the registration area that allow the rejected network slice.

6. The processor of claim 1, wherein the rejection cause is specific to an access and mobility management function (AMF).

7. The processor of claim 1, the operations further comprising:
receiving, prior to transmitting the second registration request, an indication of network slices allowed by each access and mobility management function (AMF) within an AMF pool.

8. A processor of a network function configured to perform operations comprising:
receiving a first registration request from a user equipment (UE);
generating, for transmission to the UE, a first registration accept message in response to the first registration request comprising a rejected network slice and an indication of a rejection cause corresponding to the rejected network slice indicating that the rejected network slice is not allowed in a first tracking area of a registration area;
receiving a second registration request from the UE as part of a UE initiated mobility registration updated (MRU) when the UE is in a second tracking area of the registration area, the second registration request comprising a requested network slice, wherein the requested network slice and the rejected network slice are a same network slice; and
generating, for transmission to the UE, a second registration accept message in response to the second registration request.

9. The processor of claim 8, wherein the UE is deployed within a same registration area when receiving the registration accept message and transmitting the second registration request.

10. The processor of claim 8, wherein the rejection cause is specific to the first tracking area of the registration area.

11. The processor of claim 10, wherein the rejection cause is indicated using an extended rejected network slice selection assistance information (NSSAI) information element.

12. The processor of claim 8, the operations further comprising:
transmitting, prior to receiving the second registration request, an indication of one or more tracking area identities (TAIs) within the registration area that allow the rejected network slice.

13. The processor of claim 8, wherein the network function is an access and mobility management function (AMF) and the rejection cause is specific to the AMF.

14. The processor of claim 8, the operations further comprising:
transmitting, prior to receiving the second registration request, an indication of network slices allowed by each access and mobility management function (AMF) within an AMF pool.

15. The processor of claim 8, the operations further comprising:
initiating, in response to the second registration request, an access and mobility management function (AMF) reallocation procedure to an AMF within an AMF pool.

16. A user equipment (UE), comprising:
a transceiver configured to communicate with a network; and
a processor communicatively coupled to the transceiver and configured to perform operations comprising:
generating for transmission to an access and mobility function (AMF) of a fifth generation (5G) network, a first registration request;
receiving a registration accept message in response to the first registration request comprising a rejected network slice and an indication of a rejection cause corresponding to the rejected network slice indicating that the rejected network slice is not allowed in a first tracking area of a registration area;
initiating a mobility registration update (MRU) based on the registration accept message and
generating, for transmission to the AMF, a second registration request comprising a requested network slice, wherein the requested network slice and the rejected network slice are a same network slice.

17. The UE of claim 16, wherein the UE is deployed within a same registration area when receiving the registration accept message and transmitting the second registration request.

18. The UE of claim 16, wherein the rejection cause is specific to the first tracking area of the registration area.

19. The UE of claim 18, wherein the rejection cause is indicated using an extended rejected network slice selection assistance information (NSSAI) information element.

20. The UE of claim 16, the operations further comprising:
receiving, prior to transmitting the second registration request, an indication of one or more tracking area identities (TAIs) within the registration area that allow the rejected network slice.

* * * * *